United States Patent
Etoh

(10) Patent No.: US 11,037,334 B2
(45) Date of Patent: Jun. 15, 2021

(54) IMAGE DISPLAY DEVICE, IMAGE DISPLAY METHOD, AND PROGRAM

(71) Applicant: Panasonic Intellectual Property Management Co., Ltd., Osaka (JP)

(72) Inventor: Hiroki Etoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 16/541,318

(22) Filed: Aug. 15, 2019

(65) Prior Publication Data

US 2019/0371014 A1 Dec. 5, 2019

Related U.S. Application Data

(63) Continuation of application No. PCT/JP2018/004962, filed on Feb. 14, 2018.

(30) Foreign Application Priority Data

Feb. 23, 2017 (JP) .............................. JP2017-032525

(51) Int. Cl.
*G06K 9/00* (2006.01)
*G06T 11/00* (2006.01)
(Continued)

(52) U.S. Cl.
CPC ............ *G06T 11/001* (2013.01); *G01J 5/025* (2013.01); *G06T 7/90* (2017.01);
(Continued)

(58) Field of Classification Search
None
See application file for complete search history.

(56) References Cited

U.S. PATENT DOCUMENTS 5,695,346 A * 12/1997 Sekiguchi .............. G02B 30/27
434/365
7,484,885 B1 * 2/2009 Carlson ................. G01J 5/0834
374/132
(Continued)

FOREIGN PATENT DOCUMENTS

JP 2005-016991 A 1/2005
JP 2005-016995 A 1/2005
(Continued)

OTHER PUBLICATIONS

International Search Report for corresponding Application No. PCT/JP2018/004962, dated May 1, 2018.

*Primary Examiner* — Shervin K Nakhjavan
(74) *Attorney, Agent, or Firm* — Renner, Otto, Boisselle & Sklar, LLP

(57) ABSTRACT

An image display device includes a display that displays at least one of a visible image of an object and a thermal image that represents temperature information of the object by a color and a control unit that controls the display. The control unit causes the display to display one of a first image and a second image. The first image includes the thermal image and the visible image. The second image does not include the visible image but includes a thermal image that is more enlarged as compared to the thermal image in the first image with a numerical value indicating a temperature being superimposed for each predetermined region on the thermal image in the second image.

6 Claims, 6 Drawing Sheets

(51) Int. Cl.
*G06T 7/90* (2017.01)
*G01J 5/02* (2006.01)
*G01J 5/00* (2006.01)

(52) U.S. Cl.
CPC ............... *G01J 2005/0077* (2013.01); *G06T 2207/10048* (2013.01); *G06T 2207/20212* (2013.01)

(56) References Cited

U.S. PATENT DOCUMENTS

| | | | | |
|---|---|---|---|---|
| 7,965,314 | B1* | 6/2011 | Miller | H04N 5/2258 348/164 |
| 2004/0021773 | A1 | 2/2004 | Hayakawa | |
| 2006/0266942 | A1* | 11/2006 | Ikeda | H04N 5/23238 250/334 |
| 2010/0148066 | A1* | 6/2010 | Stratmann | H04N 5/23293 250/330 |
| 2011/0001809 | A1* | 1/2011 | McManus | H04N 5/33 348/61 |
| 2013/0050453 | A1* | 2/2013 | Bergstrom | G01J 5/0275 348/61 |
| 2013/0127980 | A1* | 5/2013 | Haddick | G02B 27/0093 348/14.08 |
| 2013/0293672 | A1* | 11/2013 | Suzuki | G06F 3/041 348/36 |
| 2014/0313309 | A1* | 10/2014 | Matsuo | A61B 5/18 348/78 |
| 2015/0062346 | A1* | 3/2015 | Fraden | H04N 5/23267 348/164 |
| 2015/0091939 | A1 | 4/2015 | Suzuki | |
| 2015/0109454 | A1* | 4/2015 | Strandemar | G06T 5/50 348/164 |
| 2015/0309707 | A1* | 10/2015 | Andersson | G06F 3/04845 715/765 |
| 2018/0027205 | A1* | 1/2018 | Ruther | G01J 5/025 348/164 |
| 2018/0302564 | A1* | 10/2018 | Liu | G06T 7/33 |
| 2019/0037151 | A1* | 1/2019 | Wang | H04N 5/33 |

FOREIGN PATENT DOCUMENTS

| | | |
|---|---|---|
| JP | 2012-169723 A | 9/2012 |
| JP | 2015-194367 A | 11/2015 |
| WO | 2002/023142 A | 3/2002 |

* cited by examiner

IMAGE DISPLAY DEVICE, IMAGE DISPLAY METHOD, AND PROGRAM

TECHNICAL FIELD

The present disclosure relates to an image display device that is capable of displaying a thermal image.

BACKGROUND ART

Thermal images are used to measure a temperature of an object using far infrared rays radiated from the object. As the temperature of the object is detected by the thermal image, defected portions of the object can be specified at a location away from the object. For example, it is possible to specify a portion that generates abnormal heat, a position of water having flowed into a pipe, and a position of a cavity within a wall surface. It is difficult to specify an actual position only by the thermal image. Consequently, a method has been devised in which both a thermal image and a visible image are captured and then displayed.

Patent Literature (PTL) 1 discloses an infrared structure diagnosis method. In this infrared structure diagnosis method, at least one or more of a first display screen on which a thermal image and a visible image are arranged side by side, a second display screen on which a thermal image and a visible image are displayed in a superimposed manner, and a third display screen on which only a visible image is displayed with higher resolution as compared to the first and second display screens are prepared as a defected part specification screen. A display screen selected by a diagnosing person is displayed on a display unit. As a screen that is freely selected by the diagnosing person is displayed, it is possible to provide a diagnosis method that is convenient for a user.

CITATION LIST

Patent Literature

PTL 1: Unexamined Japanese Patent Publication No. 2005-16995

SUMMARY

When a portion that generates abnormal heat is specified from a location away from the portion, it is important to easily enlarge the heat generating portion in improving work efficiency. Shifts between images are performed by pressing buttons in PTL 1, and thus it is difficult to instinctively learn the images. A visible image can be displayed in an enlarged manner, but a thermal image cannot be displayed in an enlarged manner. It is thus difficult to learn a temperature distribution in and around a heat source.

The present disclosure has been achieved in view of the above problems, and an object of the invention is to provide an image display device that enables a user to instinctively and easily recognize temperature information of a heat source.

According to a first aspect of the present disclosure, there is provided an image display device. The image display device includes a display that displays at least one of a visible image of an object and a thermal image that represents temperature information of the object by a color and a control unit that controls the display. The control unit causes the display to display one of a first image and a second image. The first image includes the thermal image and the visible image. The second image does not include the visible image but includes a thermal image that is more enlarged as compared to the thermal image in the first image with a numerical value indicating a temperature being superimposed for each predetermined region on the thermal image in the second image.

According to a second aspect of the present disclosure, there is provided an image display method of displaying a thermal image that represents temperature information of an object by a color on a display device. The image display method includes obtaining a visible image of an object and a thermal image that represents temperature information of the object by a color and switching an image to be displayed on the display device to one of a first image and a second image according to an operation of enlarging or reducing the thermal image performed by a user. the first image includes the thermal image and the visible image. The second image does not include the visible image but includes a thermal image that is more enlarged as compared to the thermal image in the first image with a numerical value indicating a temperature being superimposed for each predetermined region on the thermal image in the second image.

The image display device of the present disclosure displays a temperature state of a heat source in a mode that enables a user to instinctively and easily recognize the temperature state. The user thus easily and instinctively learns the temperature state of the heat source.

DESCRIPTION OF EMBODIMENTS

Exemplary embodiments will be described in detail below with reference to the accompanying drawings as appropriate. Detailed descriptions more than necessary may be omitted. For example, a detailed description of a well-known matter and a duplicated description of substantially the same configuration will be omitted in some cases. This is to avoid unnecessary redundancy of the following description and to facilitate understanding by those skilled in the art.

The inventor of the present disclosure provides the accompanying drawings and the following descriptions to help those skilled in the art to fully understand the present disclosure and thus does not intend to limit the subject matter defined in the appended claims.

First Exemplary Embodiment

[1-1. Configuration]

Figure 1B:
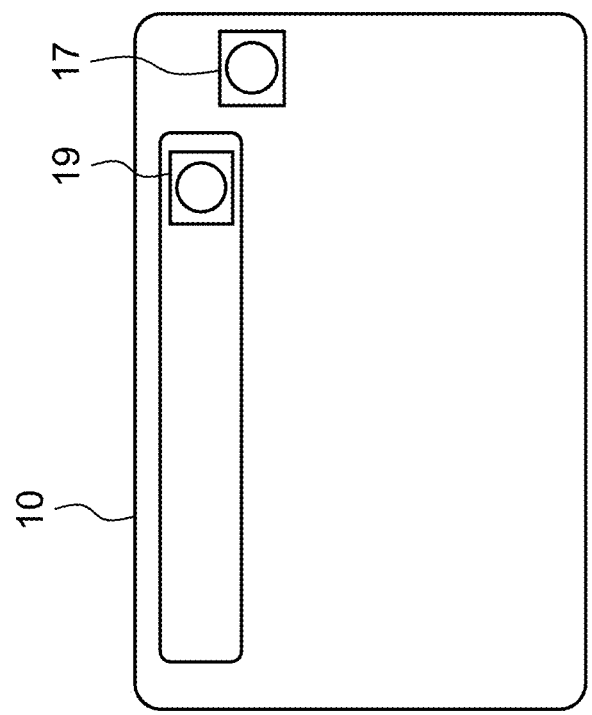
FIG. 1B illustrates the outer appearance of the information processing device according to one exemplary embodiment of the present disclosure, where the information processing device is viewed from its back surface.
Figure 1A:
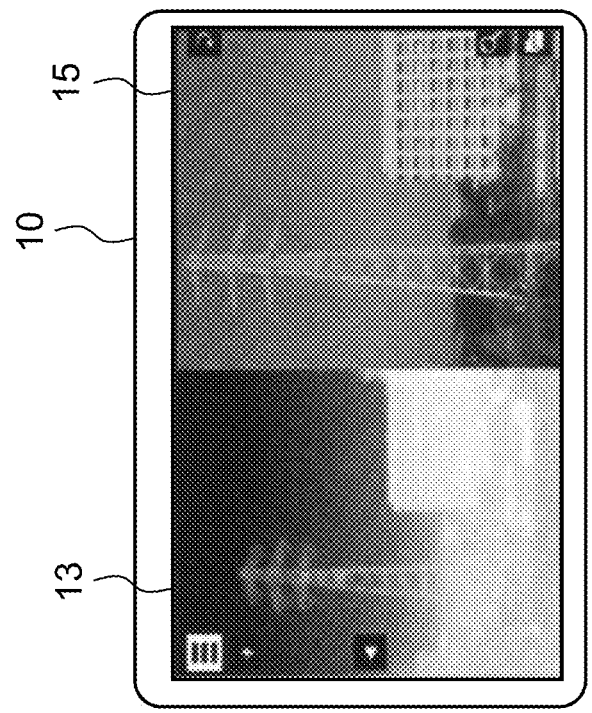
FIG. 1A illustrates an outer appearance of an information processing device according to one exemplary embodiment of the present disclosure, where the information processing device is viewed from its front surface.

FIGS. 1A and 1B each illustrate an outer appearance of information processing device 10, which is one exemplary embodiment of an image display device according to the present disclosure. FIG. 1A illustrates information processing device 10 as viewed from a front surface, and FIG. 1B illustrates information processing device 10 as viewed from a back surface. Information processing device 10 is a so-called tablet terminal. Information processing device 10 includes display 13 and touch panel 15 disposed on display 13 on a front surface side. Information processing device 10 includes visible camera 17 and infrared camera 19 on a back surface side.

Figure 2:
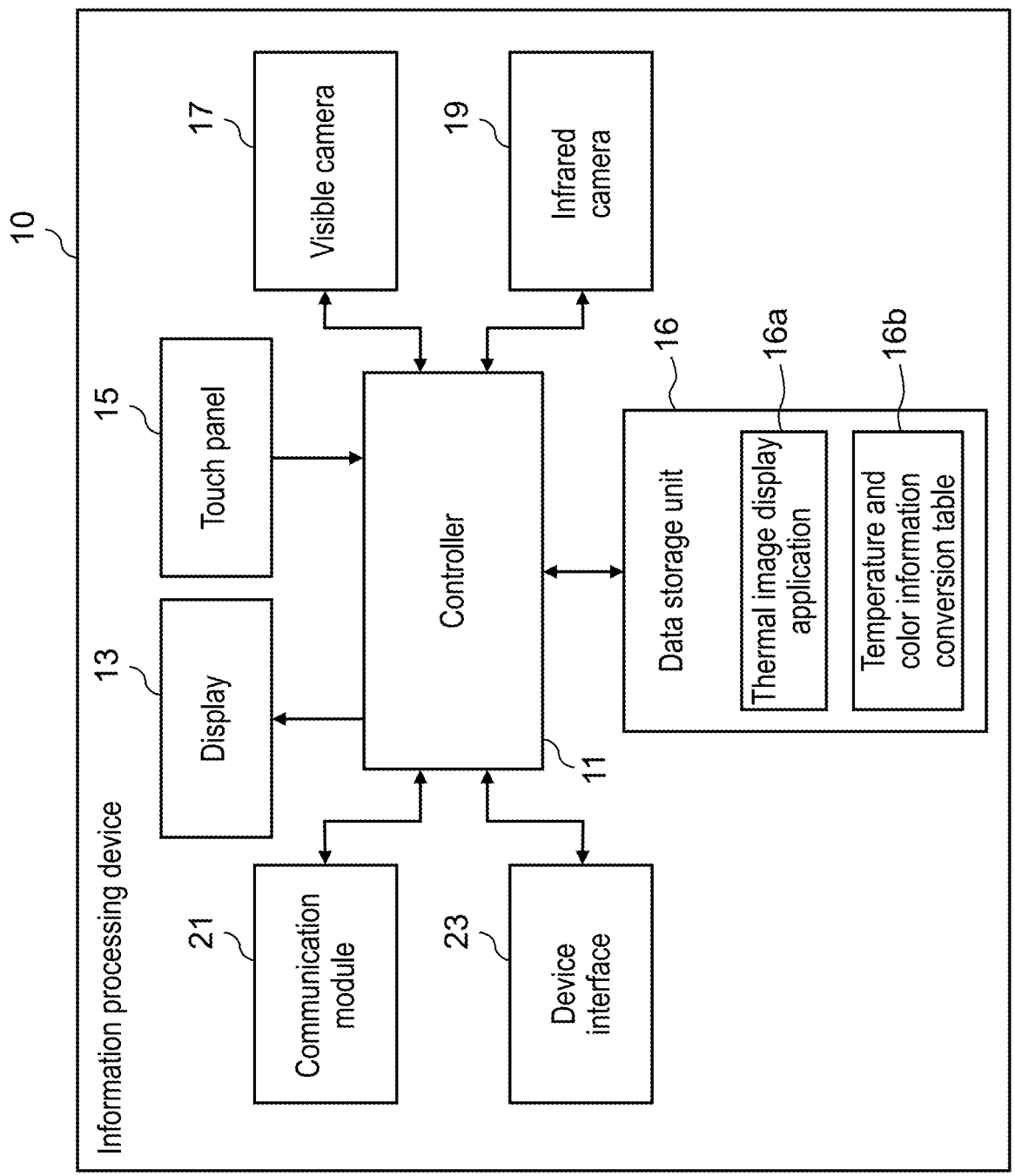
FIG. 2 is a block diagram of an internal configuration of the information processing device according to one exemplary embodiment of the present disclosure.

FIG. 2 is a block diagram of an internal configuration of information processing device 10. Information processing device 10 includes controller 11 that controls an overall operation of information processing device 10, display 13 that displays various types of information, touch panel 15 operated by a user, and data storage unit 16 that stores data and programs. Information processing device 10 also includes communication module 21 for connecting with a network and device interface 23 for connecting with an external device.

Display 13 is constituted by a liquid crystal display or an organic electroluminescence (EL) display, for example.

Touch panel 15 (an example of an operation unit) is an input device that detects a touch operation by a user's finger or a stylus pen. Touch panel 15 is disposed on display 13 so that an operation area of touch panel 15 covers a display area of display 13. Information processing device 10 may include, as operation members, a button and a slide switch that are physically disposed in information processing device 10 in addition to touch panel 15. Information processing device 10 can change (reduce or enlarge) a display magnification of an image according to a user's operation (a pinch-in operation or a pinch-out operation) on touch panel 15 and display an image whose magnification has been changed on display 13.

Communication module 21 is a circuit (a module) for connecting with a network, and performs communication based on communication standards such as 3rd Generation (3G), 4th Generation (4G), Long Term Evolution (LTE), and Worldwide Interoperability for Microwave Access (WiMAX (registered trademark)). Device interface 23 is a circuit (a module) for connecting with an external device, and performs communication based on communication standards such as Universal Serial Bus (USB (registered trademark)), High Definition Multimedia Interface (HDMI (registered trademark)), and Bluetooth (registered trademark).

Data storage unit 16 is a recording medium that stores a parameter, data, and a control program required to achieve a predetermined function. Data storage unit 16 stores thermal image display application 16a (a control program) and temperature and color information conversion table 16b that are used to achieve a function of information processing device 10 to be described later. Data storage unit 16 is constituted by a hard disk (hard disk drive (HDD)), a semiconductor storage device (solid state drive (SSD)), or a semiconductor memory (random access memory (RAM)), for example. Temperature and color information conversion table 16b is a reference table in which a temperature of a pixel in a thermal image generated by infrared camera 19 corresponds to a color of that pixel.

Visible camera 17 (an example of a first camera) is an imaging device that is sensitive to a visible light wavelength region and detects visible light from an object to generate an image (hereinafter "visible image"). Infrared camera 19 (an example of a second camera) is an imaging device that is sensitive to an infrared wavelength region and detects infrared light from an object to generate an image (hereinafter "infrared image").

Controller 11 includes a central processing unit (CPU) and executes a control program to achieve the function of information processing device 10 to be described below. Controller 11 may be achieved only by a hardware circuit specially designed so as to achieve a predetermined function. Controller 11 may be constituted by various circuits such as micro-processing unit (MPU), graphics processing unit (GPU), digital signal processor (DSP), field programmable gate array (FPGA), and application specific integrated circuit (ASIC), other than the CPU.

Figure 3:
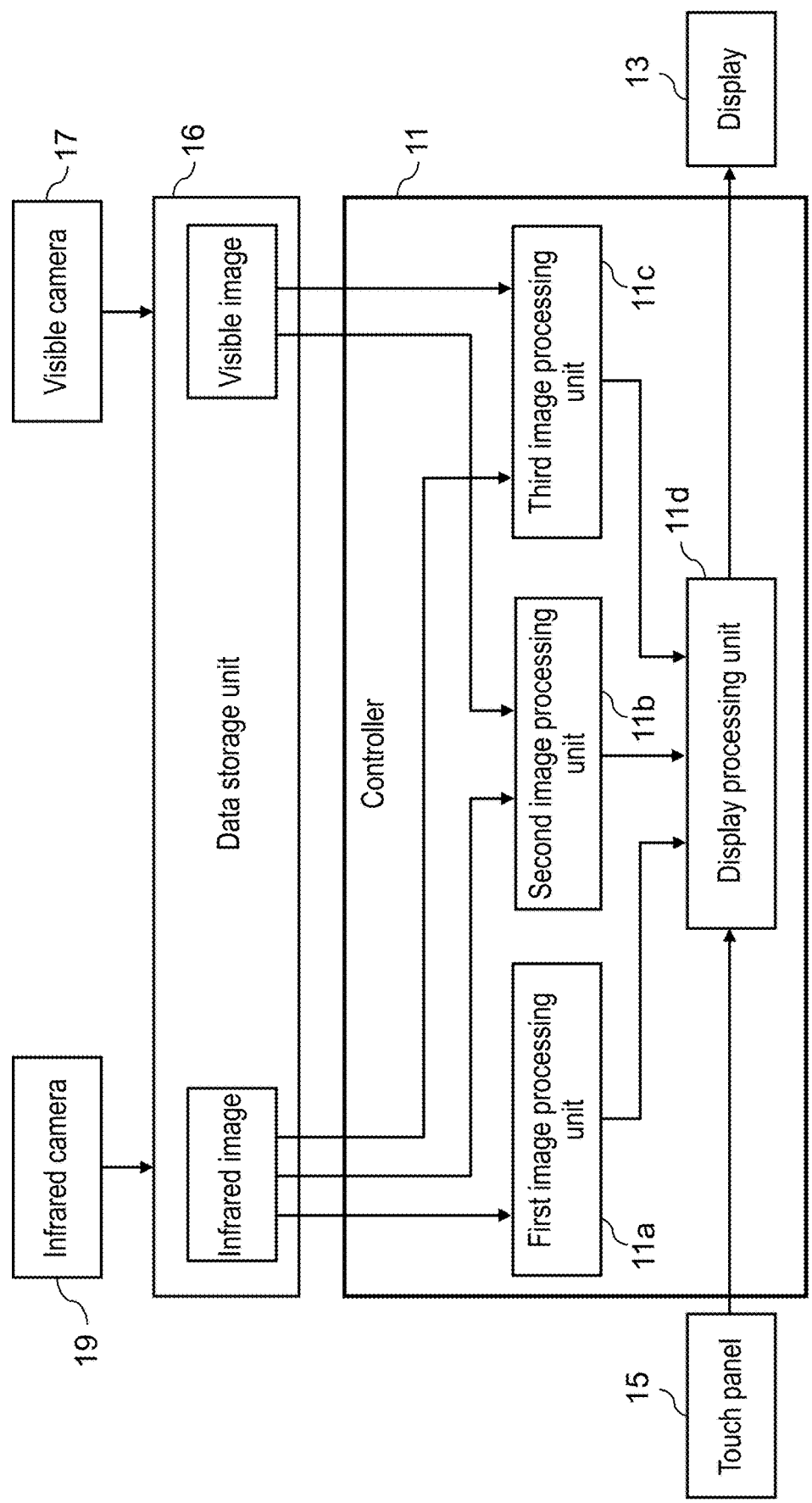
FIG. 3 illustrates a functional configuration of a controller in the information processing device.

FIG. 3 illustrates a functional configuration of controller 11. Controller 11 includes first image processing unit 11a, second image processing unit 11b, third image processing unit 11c, and display processing unit 11d. These processing units 11a to 11d are achieved by controller 11 executing thermal image display application 16a (a control program).

[1-2. Operation]

An operation of information processing device 10 configured as described above will be described below.

Information processing device 10 according to the present exemplary embodiment has a thermal image display function of displaying a thermal image based on an infrared image captured by infrared camera 19 on display 13 in various modes. The thermal image means an image in which a color of each pixel in an infrared image is set according to temperature information of an object included in that pixel. The thermal image display function is achieved by thermal image display application 16a.

[1-2-1. Display Mode]

Figure 4:
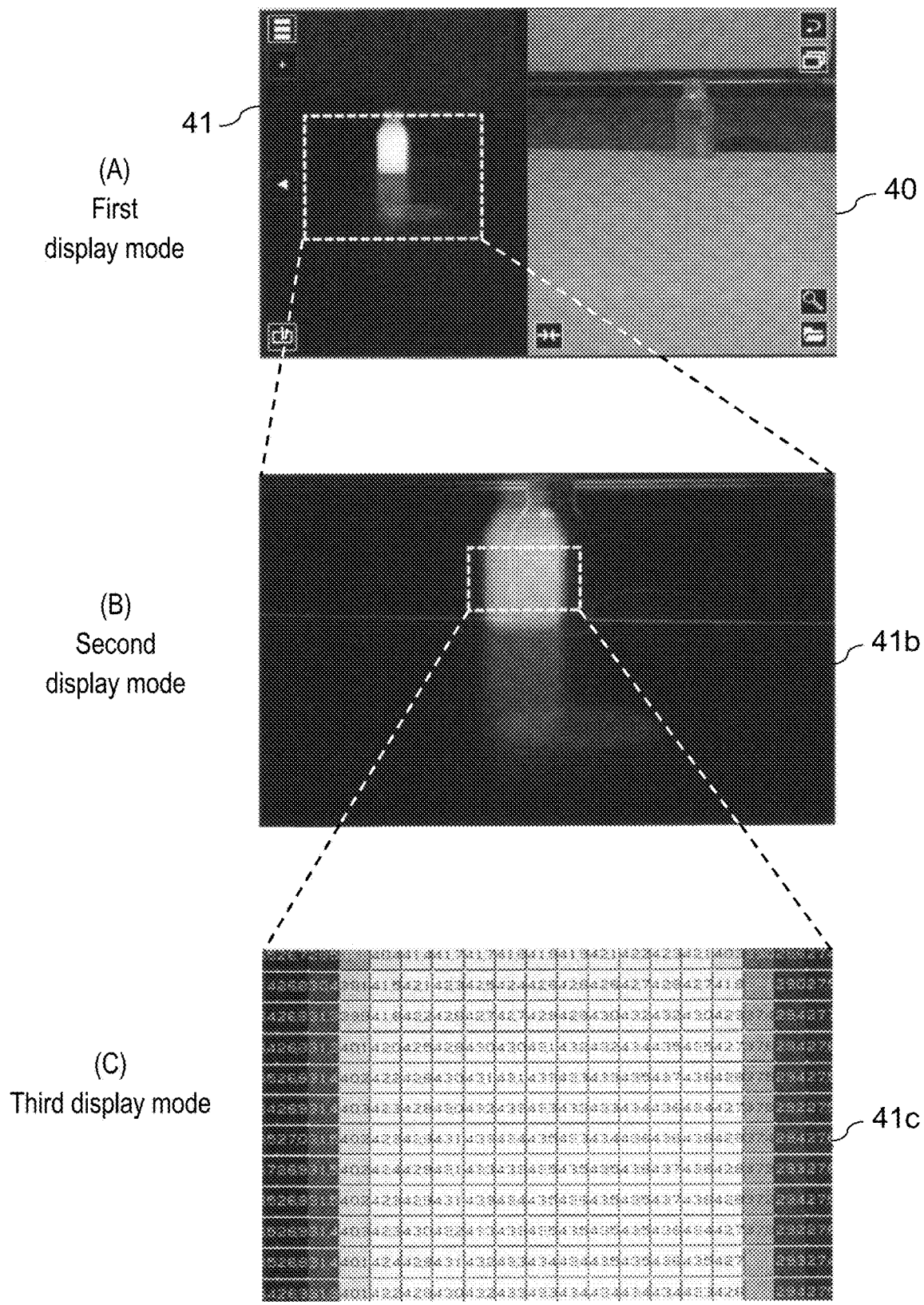
FIG. 4 illustrates explanatory views of shifts of thermal images displayed in the information processing device.

Information processing device 10 has first to third display modes as thermal image display modes in the thermal image display function. FIG. 4 (A) illustrates the first display mode. In the first display mode, thermal image 41 based on an infrared image captured by infrared camera 19 and visible image 40 captured by visible camera 17 are displayed side by side. FIG. 4(B) illustrates the second display mode. In the second display mode, a visible image is not displayed but thermal image 41b that is more enlarged than thermal image 41 in the first display mode is displayed. FIG. 4(C) illustrates the third display mode. In the third display mode, thermal image 41c that is more enlarged than thermal image 41b in the second display mode is displayed. In particular, in the third display mode, a numerical value (a temperature value) that indicates a temperature of each predetermined region is displayed in each predetermined region in thermal image 41c (see FIG. 5). In thermal image 41c, a single predetermined region that indicates a temperature value corresponds to a single pixel of an infrared image (that is, an imaging element of infrared camera 19). That is, the temperature value is displayed for each pixel of the infrared image in the third display mode.

When a user performs a gesture operation (a pinch-in operation or a pinch-out operation) on an image on touch panel 15, the user can change a magnification (a display magnification) of the image on display 13. In particular, information processing device 10 switches the display mode between the first to third display modes according to the display magnification of a thermal image that is changed by a user's operation.

For example, when a user performs a pinch-out (enlargement) operation on thermal image 41 being displayed in the first display mode, thermal image 41 is displayed in an enlarged manner. When the user continues to perform the enlargement operation, so that thermal image 41 is enlarged and visible image 40 disappears from the screen, the display mode is switched from the first display mode to the second display mode.

In the second display mode, when the user performs the enlargement operation on thermal image 41b until the enlargement rate (or the display magnification) of thermal image 41b reaches a predetermined magnification, the display mode is switched from the second display mode to the third display mode.

In the third display mode, when the user performs a pinch-in (reduction) operation on thermal image 41b, thermal image 41b is displayed in a reduced manner. When the user further performs the pinch-in (reduction) operation on thermal image 41c in the third display mode until the enlargement rate (or the display magnification) of thermal image 41c reaches a predetermined magnification, the display mode is switched from the third display mode to the second display mode.

In the second display mode, when thermal image 41b is further reduced to cause visible image 40 to appear on the screen, the display mode is switched from the second display mode to the first display mode.

As described above, the display mode of a thermal image is switched according to the enlargement rate (the display magnification) of a thermal image.

A description will be given of generation of an image to be displayed on display 13 in each of the first to third display modes. Hereinafter, an image displayed in the first display mode is referred to as "first scene image", an image displayed in the second display mode is referred to as "second scene image", and an image displayed in the third display mode is referred to as "third scene image".

As illustrated in FIG. 3, a piece of data of a visible image captured by visible camera 17 and a piece of data of an infrared image captured by infrared camera 19 are stored in data storage unit 16. Controller 11 (first to third image processing units 11a to 11c) generates first to third scene images based on the visible image data and the thermal image data stored in data storage unit 16.

(1) Generation of First Scene Image

Figures 5, 6:
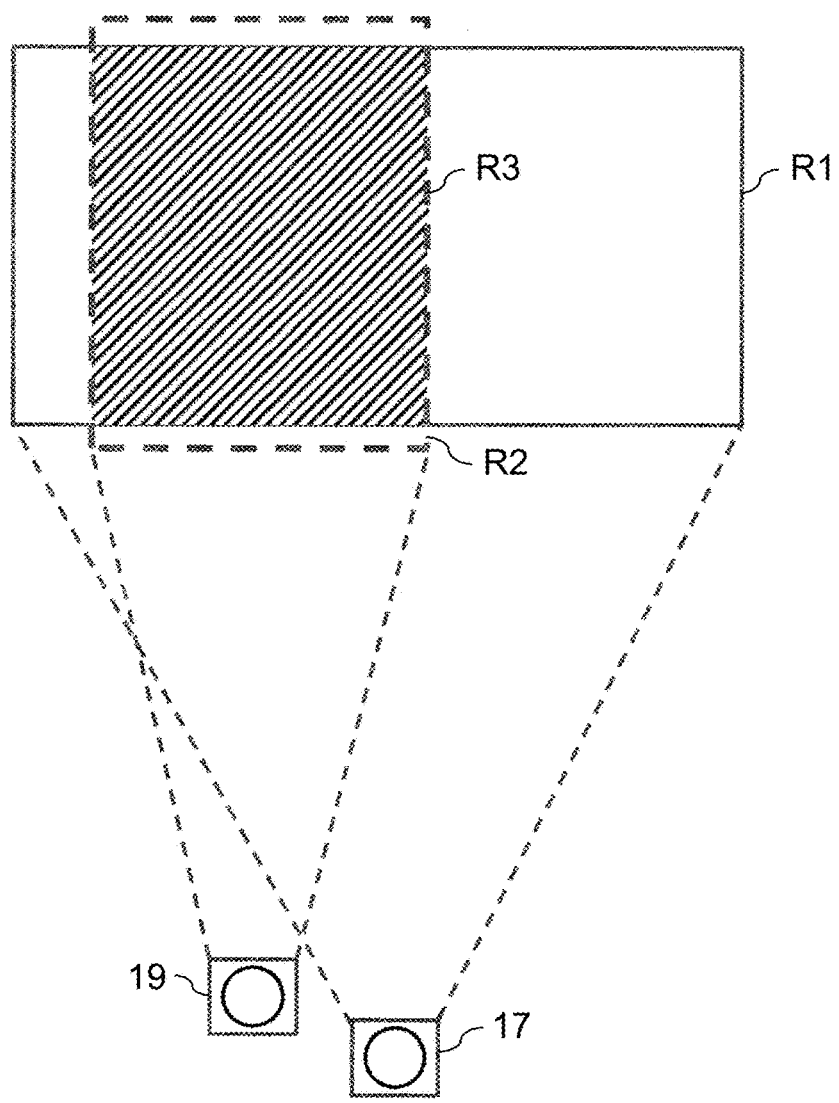
FIG. 5 is an explanatory view of a thermal image displayed in a third display mode, on which temperature values are indicated.
FIG. 6 is an explanatory view of a difference in angle of view between an infrared camera and a visible camera.

FIG. 6 is an explanatory view of a difference in capturing range (angle of view) between visible camera 17 and infrared camera 19 in information processing device 10. As illustrated in FIG. 6, visible camera 17 has a capturing range wider than that of infrared camera 19. A visible image and a thermal image to be displayed on display 13 preferably have the same angle of view (the same object). For this reason, controller 11 (first image processing unit 11a) trims region R3 (a hatched region) that overlaps region R2 of an infrared image generated by infrared camera 19 from region R1 of a visible image generated by visible camera 17. Controller 11 includes information indicating positions of regions R1 to R3 in advance, and based on this information, cuts region R3 from region R1 of the visible image.

The infrared image generated by infrared camera 19 includes information indicating the temperature of an object in each pixel region for each pixel. Controller 11 generates a thermal image that represents each pixel colored according to the temperature of the pixel from the infrared image generated by infrared camera 19. Consequently, a user can instinctively recognize the temperature of the object based on such a thermal image. Specifically, controller 11 refers to temperature and color information conversion table 16b to determine the color of each pixel based on temperature information of each pixel in the infrared image, thus generating a thermal image that represents each pixel colored according to the temperature.

Controller 11 arranges the visible image generated by trimming and the thermal image generated side by side to generate a first scene image. When the first scene image is initially generated, the visible image and the thermal image have the same size. When the thermal image is enlarged thereafter, controller 11 partially overlaps the thermal image enlarged on the visible image to generate the first scene image.

(2) Process of Generating Second Scene Image

Controller 11 (second image processing unit 11b) trims region R3 (a hatched region) that overlaps region R2 of a thermal image captured by infrared camera 19 from region R1 of a visible image captured by visible camera 17 to extract region R3. Controller 11 extracts an outline (an edge) of the trimmed visible image to generate an edge image. Controller 11 also refers to temperature and color information conversion table 16b to generate a thermal image that is colored based on the temperature, so that a user instinctively recognizes the temperature. Controller 11 superimposes the edge image on the thermal image to generate a second scene image.

(3) Process of Generating Third Scene Image

Controller 11 (third image processing unit 11c) refers to temperature and color information conversion table 16b to generate a thermal image that is colored based on the temperature, so that a user visually recognizes the temperature. Controller 11 superimposes a numerical value indicating the temperature of each predetermined pixel region on each predetermined pixel region in the thermal image that is colored based on the temperature to generate a third scene image.

[1-2-2. Switching of Display of Thermal Image]

Figure 7:
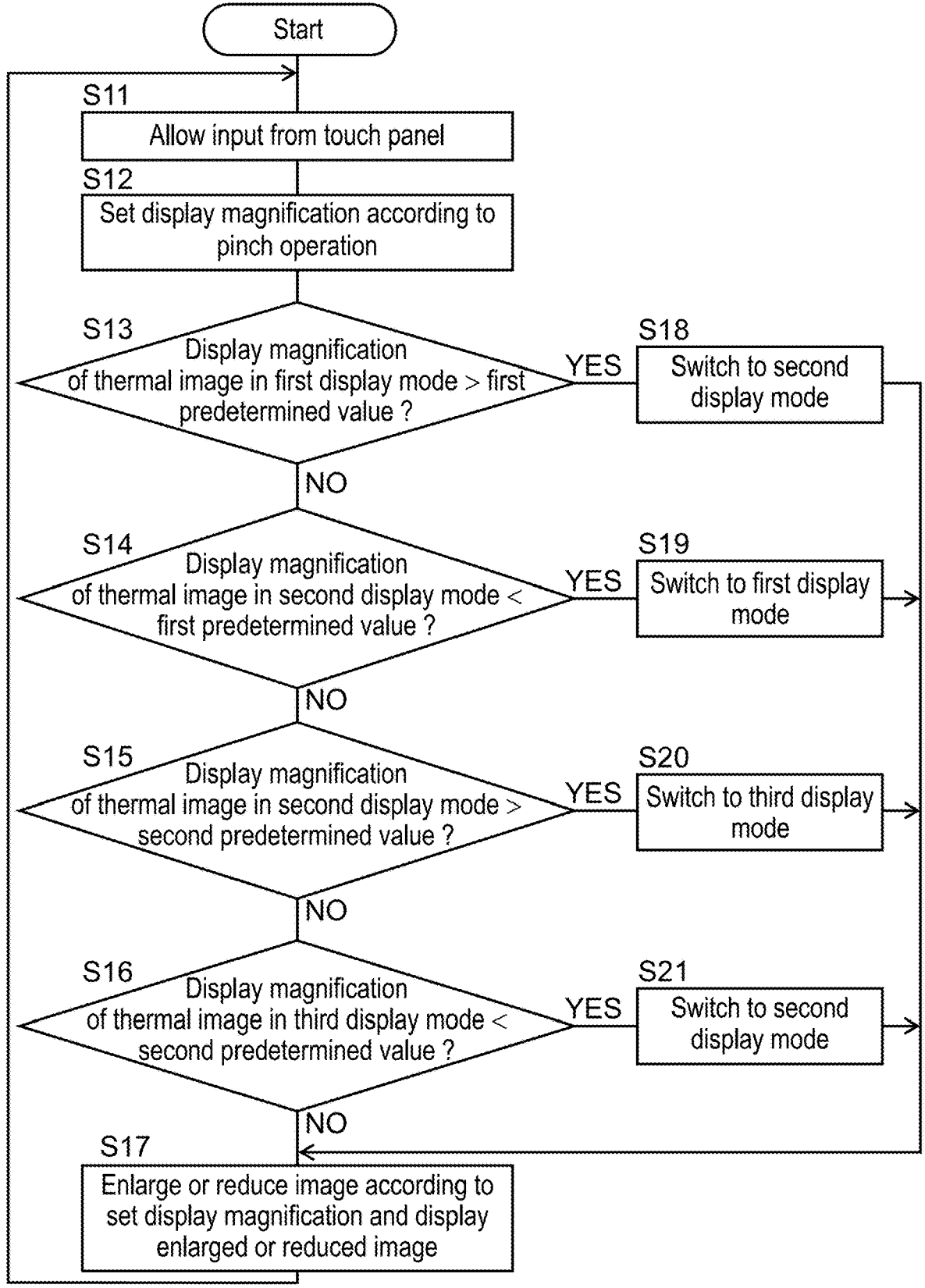
FIG. 7 is a flowchart of an operation of switching thermal images to be displayed on a screen.

FIG. 7 is a flowchart of an operation of switching display of a thermal image in information processing device 10. The operation of switching display of a thermal image in information processing device 10 will be described below with reference to the flowchart of FIG. 7. This processing is performed mainly by controller 11 (display processing unit 11d).

Controller 11 (display processing unit 11d) allows an input of information about a user's operation (pinch-in or pinch-out) on a thermal image from touch panel 15 (S11). Controller 11 sets the display magnification (the enlargement rate) of the thermal image according to a pinch-in operation or a pinch-out operation performed by a user (S12). The display magnification (the enlargement rate) is set by using the size of an infrared image generated by infrared camera 19 as a reference.

Controller 11 switches a display mode based on the display magnification (the enlargement rate) that is set according to the user's operation (S13 to S16 and S18 and S21). Specifically, controller 11 switches the display mode as follows.

In the first display mode, when the set display magnification of the thermal image is larger than a first predetermined value (YES at S13), controller 11 switches the display mode from the first display mode to the second display mode (S18). Consequently, a state where thermal image 41 and visible image 40 are displayed side by side as illustrated in FIG. 4(A) is switched to a state where enlarged thermal image 41b is displayed as illustrated in FIG. 4(B). For example, the first predetermined value is set to a value of the display magnification (the enlargement rate) of the thermal image when visible image 40 is entirely hidden by enlarged thermal image 41 on a display region of display 13.

In the second display mode, when the set display magnification of the thermal image is less than the first predetermined value (YES at S14), controller 11 switches the display mode from the second display mode to the first display mode (S19). Consequently, the state where thermal image 41b is displayed in the overall display region as illustrated in FIG. 4(B) is switched to the state where thermal image 41 and visible image 40 are displayed as illustrated in FIG. 4(A).

In the second display mode, when the set display magnification of the thermal image is larger than a second predetermined value (> the first predetermined value) (YES at S15), controller 11 switches the display mode from the second display mode to the third display mode (S20). Consequently, the state where thermal image 41b is displayed as illustrated in FIG. 4(B) is switched to a state where thermal image 41c on which temperature values are superimposed is displayed as illustrated in FIGS. 4(C) and 5. A single temperature value displayed in a third scene image in the third display mode indicates a temperature of an object corresponding to a single pixel of an imaging element of infrared camera 19. If the pixel region corresponding to a single pixel of infrared camera 19 is small in size in the third scene image, a numerical value that has a sufficient size for the user to visually recognize a temperature value cannot be superimposed on the pixel region. The second predetermined value is thus set to a value of the display magnification at which a numerical value (a temperature value) that has a sufficient size to be visually recognized by the user is placed in the pixel region of the thermal image corresponding to a single pixel of infrared camera 19. For example, it is assumed that a 32-pixel by 32-pixel region is needed as the pixel region to be visually recognized by the user. If the thermal image is enlarged 32×32 times, the numerical value (the temperature value) that has a size to be visually recognized by the user can be placed in the pixel region of the thermal image corresponding to a single pixel of infrared camera 19. Consequently, the second predetermined value is set to 32×32 in this case.

In the third display mode, when the set display magnification of the thermal image is less than the second predetermined value (YES at S16), controller 11 switches the display mode from the third display mode to the second display mode (S21). Consequently, the state where thermal image 41c on which temperature values are superimposed as illustrated in FIG. 4(C) is switched to the state where thermal image 41b that does not include any temperature values, on which an edge image of a visible image is superimposed, is displayed as illustrated in FIG. 4(B).

Controller 11 then displays an image at the set display magnification in an enlarged or reduced manner (S17).

As described above, information processing device 10 according to the present exemplary embodiment is able to enlarge or reduce a thermal image according to a user's touch operation. By enlarging the thermal image, the temperature of a target (a heat source) can be checked on the basis of numerical values. That is, the position and temperature information of the target (the heat source) whose temperature is to be checked and the vicinity of the target can be visually recognized by a simple operation. A user thus can easily and instinctively learn the temperature information.

While three display modes are set in the above exemplary embodiment, an aspect of the display mode is not limited thereto. That is, the second display mode may be eliminated and the display mode may be switched between the first display mode and the third display mode. In this case, if the display magnification of a thermal image is not sufficiently high in the third display mode, it may be impossible to display the thermal image so as to visually recognize a numerical value indicating the temperature of a single pixel in an infrared image (an imaging element of infrared camera 19). Consequently, when the display magnification of the thermal image is less than a predetermined value in the third display mode, an average value of temperatures of a predetermined number of pixels in the infrared image may be displayed. The predetermined number is set so that a numerical value to be recognized by a user is displayed in a region of the predetermined number of pixels. The numerical value indicating the temperature can thus be displayed so as to be visually recognized by the user.

[1-3. Advantageous Effects and Like]

As described above, information processing device 10 (an example of an image display device) according to the present exemplary embodiment includes display 13 that displays at least one of a visible image of an object and a thermal image that represents temperature information of the object by colors and controller 11 (an example of a control unit) that controls display 13. Controller 11 causes display 13 to display one of a first scene image (an example of a first image) and a third scene image (an example of a second image). The first scene image includes thermal image 41 and visible image 40. The third scene image does not include a visible image but includes thermal image 41c that is more enlarged as compared to the thermal image in the first scene image with a numerical value indicating a temperature being superimposed for each predetermined region on thermal image 41c.

According to the above configuration, the visible image and the thermal image are arranged side by side in the first scene image. Consequently, the position and shape of a heat source in the thermal image can be recognized more accurately from the visible image. As the temperature information is displayed by being superimposed on the thermal image in the third scene image (see FIGS. 4(C) and 5), a user can easily recognize the temperature of a target. The user can thus display a required image according to a purpose.

Information processing device 10 further includes a touch panel (an example of an operation unit) that allows an input of a user's operation of enlarging or reducing a thermal image to be displayed on display 13. Controller 11 switches an image to be displayed on the display according to an enlargement rate of the thermal image based on the user's operation. It is thus possible to switch a method of indicating the temperature information by a simple operation such as enlargement and reduction.

Moreover, controller 11 causes display 13 to display a second scene image that does not include a visible image but includes thermal image 41b that is more enlarged as compared to thermal image 41 in the first scene image but more reduced as compared to thermal image 41c in the third scene image. Controller 11 causes display 13 to display one of the first to third scene images. It is thus possible to gradually switch a mode of displaying a thermal image according to the enlargement rate of the image.

The second scene image includes a thermal image on which an edge image extracted from a visible image is superimposed. The outline of the heat source is recognized more easily in the thermal image.

The thermal image is generated from an infrared image captured by infrared camera 19. The numerical value indicating the temperature in the third scene image indicates the temperature represented by the temperature information obtained from a single pixel of the infrared image. It is thus possible to recognize a value of the temperature of each region in the heat source.

The present exemplary embodiment also discloses an image display method of displaying a thermal image that represents temperature information of an object by colors on a display.

The image display method includes obtaining a visible image of an object and a thermal image that represents temperature information of the object by colors and switching an image to be displayed on a display (an example of a display device) to one of a first scene image (a first image) and a third scene image (a second image) according to an operation of enlarging or reducing the thermal image performed by a user. The first scene image includes the thermal image and the visible image. The third scene image does not include the visible image but includes a thermal image that is more enlarged as compared to the thermal image in the first image with a numerical value indicating a temperature being superimposed for each predetermined region on the thermal image in the third scene image.

The image display method described above may further include displaying a second scene image (a third image) that does not include the visible image but includes a thermal image that is more enlarged as compared to the thermal image in the first image but more reduced as compared to the thermal image in the second image on the display. In this case, the image to be displayed on the display is switched to one of the first to third scene images according to the operation of enlarging or reducing the thermal image performed by the user.

Other Exemplary Embodiments

As described above, the first exemplary embodiment has been described as an example of the technique disclosed in the present application. However, the technique of the present disclosure is not limited to the first exemplary embodiment, and also applicable to other exemplary embodiments that undergo some modifications, replacements, additions, and omissions, for example, as appropriate. In addition, new exemplary embodiments can also be achieved by combining the respective constituent elements described in the first exemplary embodiment. Some other exemplary embodiments will be described below as examples.

In the first exemplary embodiment, a numerical value in thermal image 41c indicates the temperature of a single pixel of an infrared image (an imaging element of infrared camera 19) in the third display mode. However, the method of displaying a temperature value is not limited thereto. A numerical value in thermal image 41c may indicate at least one of the average value, minimum value, and maximum value of the temperature of a region in the infrared image, which is constituted by a plurality of pixels.

In the first exemplary embodiment, the display magnification of an image is changed by an operation on touch panel 15. However, the operation means for changing the display magnification is not limited to a touch panel. Any input device such as a mouse wheel may be used as the means for changing the display magnification.

The first exemplary embodiment has been described by taking a tablet terminal as an example of an image display device. However, the ideas of the present disclosure can be applied to other electronic devices. For example, the ideas of the present disclosure can be applied to electronic devices such as smartphones and notebook personal computers (PCs).

Thermal image display application 16a and temperature and color information conversion table 16b may be installed from a portable recording medium such as an optical disk and a memory card into information processing device 10 or may be downloaded from a server through a network.

The second scene image includes an edge image and a thermal image in the first exemplary embodiment. However, the ideas of the present disclosure are not limited to this case. It is permissible that the second scene image includes the thermal image but does not include the edge image.

The exemplary embodiments have been described above as examples of the technique in the present disclosure. For that purpose, the accompanying drawings and the detailed description have been provided.

The constituent elements illustrated in the accompanying drawings and described in the detailed description may include constituent elements essential for solving the problems, as well as constituent elements that are not essential for solving the problems but required to exemplify the above techniques. For this reason, it should not be immediately recognized that those unnecessary constituent elements are necessary just because those unnecessary constituent elements are described in the accompanying drawings and the detailed description.

In the description, a step of describing a program to be recorded in a recording medium includes not only processes that are performed in time series and in order described but also processes that are not necessarily performed in time series but performed in parallel or individually.

Since the exemplary embodiments described above are for exemplifying the technique of the present disclosure, various modifications, replacements, additions, and omissions can be made within the scope of the claims or their equivalents.

INDUSTRIAL APPLICABILITY

The image display device of the present disclosure is capable of informing a user about temperature information of a target so as to enable the user to instinctively recognize the temperature information of the target. The image display device of the present disclosure is thus useful for a device of informing a user about temperature information of a target.

REFERENCE MARKS IN THE DRAWINGS

10: information processing device
11: controller
13: display
16: data storage unit
16a: thermal image display application
16b: temperature and color information conversion table
17: visible camera
19: infrared camera

The invention claimed is:

1. An image display device comprising:
a display that displays at least one of a visible image of an object and a thermal image that indicates temperature information of the object;
a control unit that controls the display; and
an operation unit that allows an input of a user's operation of enlarging or reducing an image to be displayed on the display,
wherein the control unit causes the display to display one of a first image, a second image, and a third image, the first image including the thermal image and the visible image, the second image including a thermal image with a numerical value indicating a temperature being superimposed for each predetermined region on the thermal image in the second image, the third image including a thermal image with an edge image extracted from the visible image being superimposed on the thermal image in the third image, and
when the control unit increases an enlargement rate of the image to be displayed on the display according to the user's operation of the operation unit, the control unit changes the image to be displayed on the display in an order of the first image, the third image, and the second image.

2. The image display device according to claim 1, wherein the thermal image is generated from an infrared image captured by an infrared camera, and
the numerical value that indicates the temperature in the second image indicates a value of temperature information obtained from a single pixel of the infrared image.

3. The image display device according to claim 1, wherein the thermal image is generated from an infrared image captured by an infrared camera, and
the numerical value that indicates the temperature in the second image indicates an average value of temperature information values obtained from a predetermined number of pixels of the infrared image.

4. The image display device according to claim 1, further comprising:
a first camera configured to capture the visible image; and
a second camera configured to capture an infrared image, wherein the control unit generates the thermal image based on the infrared image.

5. The image display device according to claim 1, wherein the image display device is a tablet terminal.

6. An image display method of displaying a thermal image that indicates temperature information of an object on a display device, the image display method comprising:
obtaining a visible image of the object and a thermal image that indicates the temperature information of the object; and
switching an image to be displayed on the display device to one of a first image, a second image, and a third image according to an operation of enlarging or reducing the thermal image performed by a user, the first image including the thermal image and the visible image, the second image including a thermal image with a numerical value indicating a temperature being superimposed for each predetermined region on the thermal image in the second image, the third image including a thermal image with an edge image extracted from the visible image being superimposed on the thermal image in the third image,
wherein when an enlargement rate of the image to be displayed on the display device is increased according to the operation, the image to be displayed on the display device is changed in an order of the first image, the third image, and the second image.

* * * * *